United States Patent [19]

Fencl

[11] 4,227,044
[45] Oct. 7, 1980

[54] PEN STATUS SYSTEM FOR DIGITIZER PEN
[75] Inventor: George A. Fencl, Phoenix, Ariz.
[73] Assignee: Talos Systems, Inc., Scottsdale, Ariz.
[21] Appl. No.: 5,195
[22] Filed: Jan. 22, 1979
[51] Int. Cl.³ .............................................. G08C 21/00
[52] U.S. Cl. ........................................ 178/19; 178/18
[58] Field of Search ................... 178/18, 19; 340/195, 340/199, 545

[56] References Cited

U.S. PATENT DOCUMENTS

| 3,772,669 | 11/1973 | Johnston et al. | 340/545 |
|---|---|---|---|
| 3,886,311 | 5/1975 | Rodgers et al. | 178/18 |
| 4,140,998 | 2/1979 | Bettle | 340/199 |

*Primary Examiner*—Thomas A. Robinson
*Attorney, Agent, or Firm*—Cahill, Sutton & Thomas

[57] ABSTRACT

A pen status indicating system for a digitizer pen utilized in conjunction with a digitizer having a grid of spaced conductors positioned beneath a writing surface. The digitizer includes an electronic system which scans the spaced conductors and senses signals produced in the spaced conductors by a transmitting coil located near the writing tip of a pen used to write on the writing surface. The pen status indicating system senses whether the writing tip of the pen is pressed against the writing surface. The pen status indicating system includes a split inductor having a movable core coupled in direct communication with a pen cartridge having the writing tip connected thereto. When the pen is raised, the movable core occupies a first position relative to the secondary winding of the split inductor windings and when the pen is lowered, the movable core is caused to occupy a second position relative to the split inductor windings, causing a phase reversal in a signal produced on a center tap conductor of the split inductor. A sensing circuit including a phase sensitive detector, a filter, and a comparator produces a pen status output signal in response to the signal on the center tap conductor.

10 Claims, 6 Drawing Figures

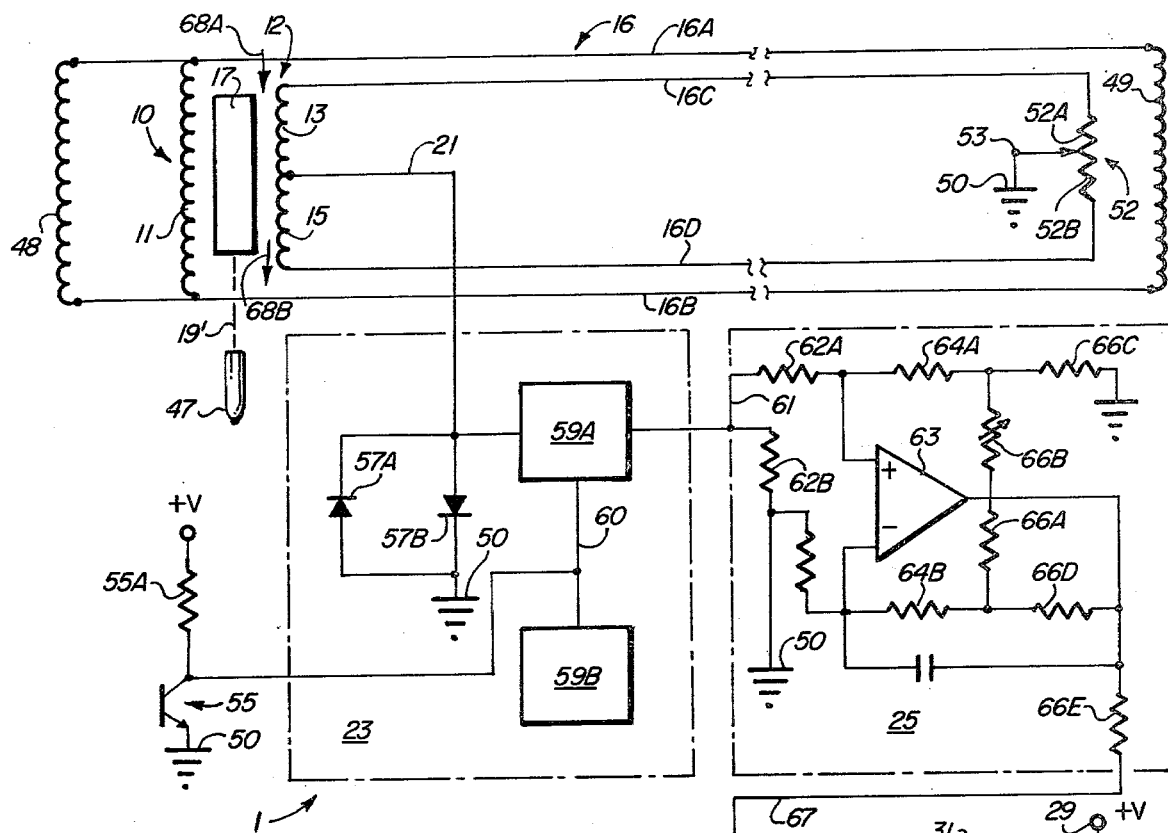
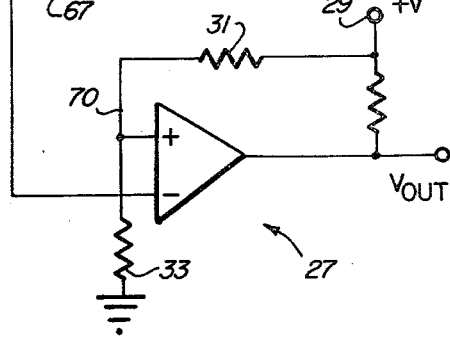
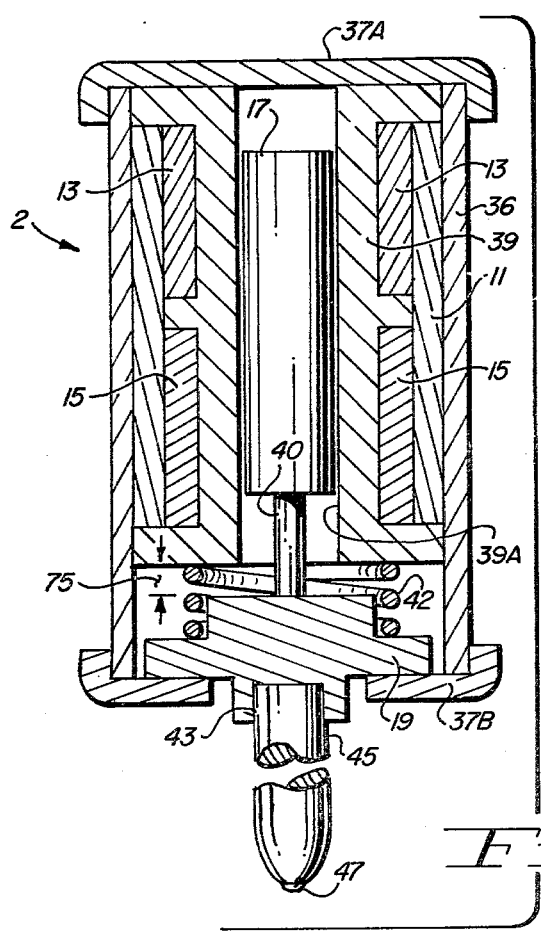
Fig-1
Fig-2

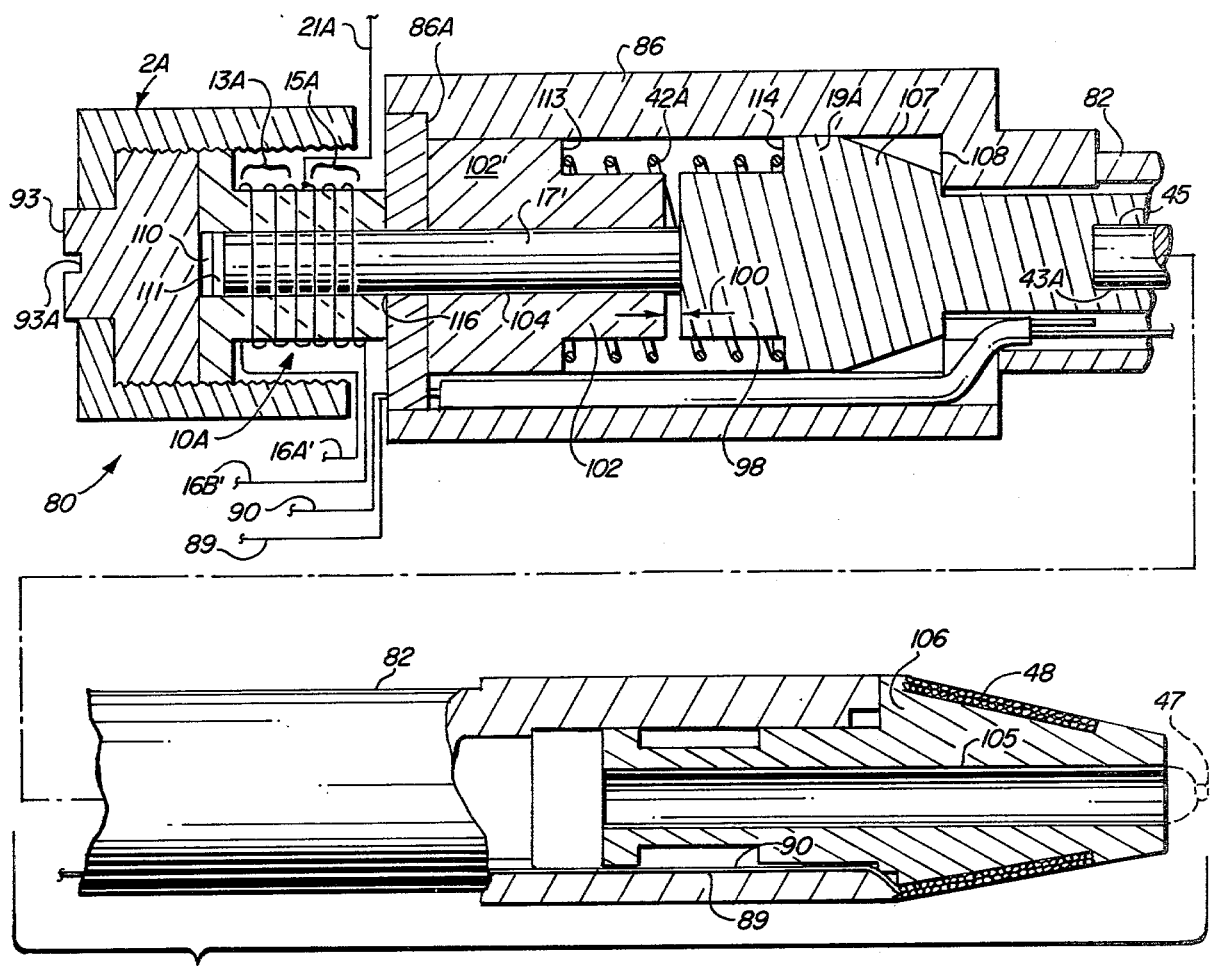
FIG.-4A
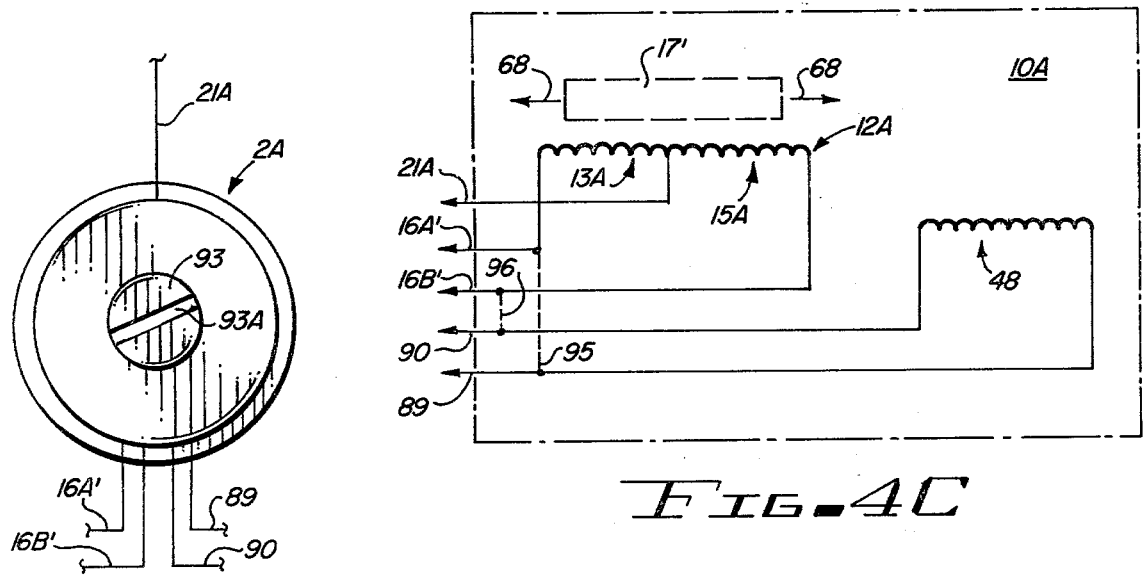
FIG.-4B
FIG.-4C

PEN STATUS SYSTEM FOR DIGITIZER PEN

BACKGROUND OF THE INVENTION

1. Field of the Invention

The invention relates to digitizers having a pen, and more particularly, to systems for detecting and indicating whether the writing tip of the pen is raised or lowered with respect to a writing surface of the digitizer.

2. Description of the Prior Art

Electronic digitizers which include a horizontal table having a grid of spaced conductors implanted in the X and Y directions beneath a writing surface supported by the table and also including a pen having a writing tip which can be raised above the writing surface or lowered to contact the writing surface are well known. For example, see U.S. Pat. Nos. 3,886,311 and 3,904,822.

Such digitizing systems are commonly utilized to enter digital data into a computer or to produce drawings or writings from data stored in a digital computer. In either case, it is frequently necessary for the pen to be lowered to make a mark on the writing surface, and then be raised and moved to another point above the writing surface and again lowered to make another mark on the writing surface spaced from the first mark. The pen assemblies of such systems may include an electromechanical device controlled by electronic circuitry and a digitizer for raising and lowering the pen tip in response to a control signal. In the course of entering data into a computer by means of a pen or making drawings by a computer controlled pen, some applications of digitizers require a pen tip to be raised from and lowered to a digitizer writing surface as many as several hundred thousand times per day. It is necessary that the electronic system controlling pen position be able to detect whether the pen tip is raised or lowered in order to prevent extraneous noise occurring when the pen tip is not contacting the writing surface from being interpreted as data. (It should be noted that even when the writing tip does not contact the writing surface, the pen tip and the underlying grid conductors may be sufficiently close to cause large magnitude signals to be detected, which large magnitude signals would cause data errors if no pen status signal were available to "gate out" such large magnitude signals.) In the past, a mechanical switch which is opened (or closed) when the pen is pressed against the writing surface and is closed (or opened) when the pen is raised has been utilized. However, due to the very large number of times that pens are raised and lowered in some applications, the reliability of such prior mechanical pen position status switches has been inadequate. Thus, although known mechanical pen position sensing switches have been economical, their reliability has been unacceptable and has caused a great deal of loss of digitizer operating time due to the fact that errors have been produced as result of such unreliability. The digitizers consequently have been inoperative during the time between discovery of a pen switch error and the time that a serviceman can repair the pen. Although present mechanical pen switches are initially economical, their costs in the forms of losses due to errors and system down time have been unacceptably high.

It is believed that optical switches including light emitting diodes, and photosensitive detectors have been utilized as pen status switches in digitizer systems. However, such devices are more expensive than presently used mechanical switches, since they require suitable encapsulation, means for producing a light-interrupting path, and bias circuitry for the light emitting diode and photosensitive detector circuitry.

Accordingly, it is an object of the invention to provide a low cost, yet highly reliable, system in a digitizer for indicating whether the writing tip of a digitizer pen is raised above a writing surface supported by the digitizer or is pressed against the writing surface.

Another object of the invention is to provide a highly reliable digitizer pen status indicating system which is readily compatible with circuitry utilized elsewhere in digitizers.

A novelty search directed to the subject matter of the invention uncovered U.S. Pat. No. 3,621,720, which discloses a linear variable differential transformer incorporated in a pen utilized to produce continuous signals representative of the pressure applied to a pen tip by a person utilizing the pen to write his signature. The continuous signals produced are amplified, and their magnitude is instantaneously traced out on a chart recorder and compared to a similar chart known to be correct for a particular signature to determine if the present water is forging the signature. Other patents deemed less relevant uncovered by the novelty search include U.S. Pat. Nos. 3,528,295, 3,235,790, 3,356,933, 3,376,533, 3,484,678, and 3,546,648.

SUMMARY OF THE INVENTION

Briefly described, and in accordance with one embodiment thereof, the invention provides a pen status detecting system incorporated in a digitizer and including a split inductor having a center tap, a movable core connected in fixed relationship to a writing tip of a pen, a spring for resiliently biasing the movable core to first position when the writing tip is out of contact with a writing surface but allowing the movable core to move to a second position if the writing tip is pressed against the writing surface, and a sensing circuit for sensing a change caused in a signal produced on the center tap by the movement of the movable core between the first and second positions. In the described embodiment of the invention, the transmitting coil is mounted on the pen adjacent the writing tip, and a first AC signal produced in response to a reference signal generated in the digitizer energizes the transmitting coil. The first AC signal also energizes the split inductor, producing a clocking signal on the center tap. The writing tip is included within a ballpoint pen cartridge further including an elongated ink reservoir. The free end of the ink reservoir is attached to an actuator element which is biased to a third position by a spring. The movable core is attached to the actuator element, whereby the movable core is in the first position when the actuator element is in the third position. When the writing tip is pressed against a writing surface, the actuator element is moved to a fourth position, thereby moving the movable core to the second position. The first and second positions are selected so that the movement of the movable core therebetween produces a phase reversal in the signal produced at the center tap. The sensing circuit includes a phase sensitive detector which is clocked in response to the reference signal. The output of the phase sensitive detector is filtered to produce an output signal which is at a first level when the movable core is at the first position and is at a second level when the movable core is at the second position. The output of the filter circuit is provided as an input to a comparator, which produces an output logic signal indicative of whether the writing tip is pressed against the writing surface. In an alternative embodiment of the invention, the split inductor includes the secondary winding of a linear variable differential transformer.

BRIEF DESCRIPTION OF THE DRAWINGS

FIG. 1 is a schematic drawing of the pen status system of the present invention.

FIG. 2 is a partial sectional view illustrating a unit containing an electronic pen switch utilized in the system of FIG. 1.

FIG. 4A discloses an alternate electronic pen switch incorporated in a pen.

FIG. 4B shows an end view of the pen of FIG. 4A.

FIG. 4C is a schematic diagram illustrating the electronic pen switch and the pen nose coil of FIG. 4A.

DESCRIPTION OF THE INVENTION

Figure 3:
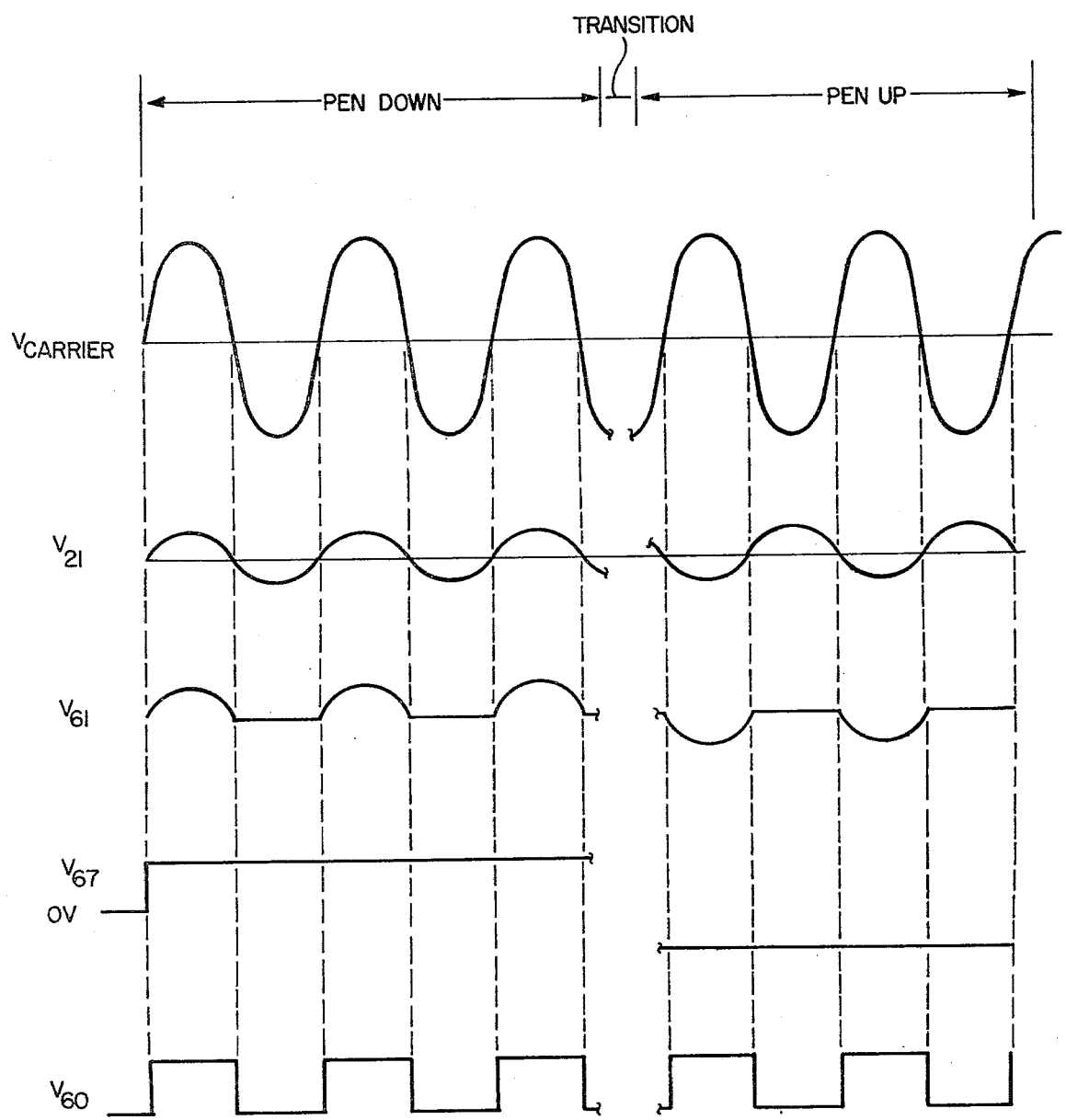
FIG. 3 discloses waveforms which are useful in describing the operation of the system of FIG. 1.

Referring now to FIGS. 1 and 2, an electronic pen switch circuit system 1, shown in FIG. 1, includes a linear variable differential transformer (LVDT) 10 enclosed within a capsule 2 (shown in FIG. 2) of a pen controlled by an electronic digitizer system. The details of the electronic digitizer system are set forth in detail in co-pending patent applications, Ser. Nos. 921,514 and 921,572, both filed July 3, 1978 and both assigned to the present assignee and incorporated herein by reference.

Still referring to FIG. 1, LVDT 10 includes a primary winding 11 energized by a high frequency (96 kHz) signal applied to a transmitting coil 48 located near the writing tip 47 of a pen. The 96 kHz signal is generated by an output transformer (reference numeral 49), a power amplifier (not shown, but described in the incorporated applications), to drive pen coil 48, which transmits signals to be detected by scanning spaced X and Y conductors of a grid embedded immediately beneath a writing surface of the digitizer system, as explained in detail in the above-referenced co-pending patent applications. The 96 kHz signal is conducted to transmitting coil 48 by means of a cable 16 from output transformer 49. More specifically, conductors 16A and 16B of cable 16 apply the 96 kHz signal to the terminals of primary winding 11.

LVDT 10 includes a "split" secondary winding or inductive means 12, which includes a first section 13, a second section 15, a center tap 21 joining sections 13 and 15. Secondary winding 12 also includes two end terminals connected to conductors 16C and 16D of cable 16. Conductors 16C and 16D are connected to end terminals of a remote potentiometer 52 having a center tap 53 connected to ground or reference voltage conductor 50. It can be seen that sections 52A and 52B of potentiometer or resistive means 52 and sections 13 and 15 of split secondary winding 12 form a conventional bridge circuit, the operation of which is very well known and need not be set forth in detail.

LVDT 10 includes a movable ferrite core 17 rigidly coupled by means 19' to writing tip 47 of the pen whose status is sensed and/or controlled by the digitizer system. When pen tip 47 is raised above the writing surface, spring 42 of FIG. 2 biases or urges movable core 17 to its lowest position. When writing tip 47 is pressed against a writing surface (not shown), movable core 17 is pushed upward with respect to secondary winding 12. This causes the inductance of upper section 13 of secondary winding 12 to increase and also causes the inductance of section 15 to decrease. The changes in inductance cause the voltages across sections 13 and 15 to change, thereby changing the voltage at center tap 21. The initial position of movable core 17 is selected so that when writing tip 47 is pressed against the writing surface the phase of the signal produced between center tap 21 and ground conductor 50 is reversed.

Some of the details of the construction of the pen of the above described digitizer system are shown in FIG. 2. More particularly, the details of the mounting of LVDT 10 in capsule 2 and the connection of movable core 17 to a ballpoint pen cartridge which includes writing tip 47 and an ink reservoir 45 are shown. Referring now to FIG. 2, LVDT 10 is enclosed in capsule 2, which is designed to provide a closed magnetic path to prevent interference from extraneous signals and to keep magnetic flux lines enclosed within capsule 2, thereby providing increased efficiency of LVDT 10. Primary winding 11 and secondary winding 12 are wound on a plastic bobbin 39, as shown. Sections 13 and 15 of secondary winding 12 are wound on the bobbin 39 and primary winding 11 is wound over (but, of course, insulated from) secondary winding 12. The cylindrical wall 36 of capsule 2 is made of ferromagnetic material, preferably steel. Bobbin 39 is made of plastic. Molded caps 37A and 37B are also formed of ferromagnetic material. The ferromagnetic walls and caps act to keep the magnetic fields efficiently enclosed in capsule 2. Lower molded cap 37B has a central aperture through which an actuator element or connecting means 19 extends. Actuator element 19 is spring biased outwardly against the inner surface of cap 37B by means of a coil spring or resilient means 42, as shown in the drawings. Bobbin 39 has a cylindrical opening 39A wherein movable ferrite core 17 is vertically slidably disposed. Ferrite core 17 is attached by means of connecting rod 40 to actuator element 19.

Actuator element 19 includes a lower recess 43 into which an ink reservoir 45 of a conventional ballpoint pen cartridge snugly fits. Thus, when writing tip 47 is raised, movable core 17 slides upward in cylindrical opening 39A, producing the above described variation in inductance of upper and lower sections 13 and 15 of secondary winding 12, thereby producing the above mentioned phase shift in the signal on center tap conductor 21.

Referring again to FIG. 1, the above mentioned phase shift on center tap conductor 21 is detected by means of phase sensitive detector circuitry or sensing circuit means 23. Phase sensitive detector 23 includes a pair of input diodes 57A and 57B connected between ground conductor 50 and the input of circuit 59A. Circuits 59A and 59B can be implemented utilizing integrated circuit analog switches manufactured by Radio Corporation of America (RCA) and designated by Model No. CD4053. Conductor 60 is connected to the clock inputs of the integrated circuit analog switches 59A and 59B for conducting a reference signal thereto. The operation of the two analog switches to produce a phase sensitive output on node 61 is explained in detail in the above referenced patent applications.

The clocking signal on conductor 60 is produced by an inverter including transistor 55 and resistor 55A, which inverter is driven by a reference oscillator circuit described in the above referenced patents. The signal on conductor 60 is therefore in phase with the signals produced by output transformer 49 in FIG. 1. The latter signal is indicated by the waveform designated $V_{carrier}$ in FIG. 3, and the signal on conductor 60 is indicated by the waveform $V_{60}$ in FIG. 3.

It should be noted that the various waveforms in FIG. 3 illustrate the main significant waveforms of the circuit of FIG. 1 for both the "pen down" and "pen up" conditions, as explained subsequently.

Referring again to FIG. 1, output node 61 couples the output from phase sensitive detector 23 to the input of filter circuitry 25. Filter circuitry 25 includes an operational amplifier 63, which may be implemented utilizing an integrated circuit Model CA3130 operational amplifier, manufactured by RCA, connected to the illustrated conventional biasing and filtering circuitry including resistors 62A–C, 64A and B, resistor 66A–E and capacitor 65.

The output of filter circuitry 25 appears at node 67, and the waveform is shown by waveform $V_{67}$ in FIG. 3. The latter waveform is provided as an input to comparator 27, which is implemented by means of an LM311 integrated circuit comparator manufactured by National Semiconductor Corporation. Resistors 31 and 33 provide a threshold bias voltage at node 70, which voltage is applied to the positive input of comparator 27. The threshold bias voltage at node 70 is selected to provide satisfactory noise margin.

The most significant waveforms occurring during operation of the circuit of FIG. 1 are shown in FIG. 3, wherein the waveform $V_{carrier}$ represents the 96 kHz signal applied by means of conductors 16A and 16B to pen coil 48 from power amplifier output transformer 49. $V_{carrier}$ is thus also applied to primary winding 11 and thereby induces a 96 kHz current in secondary winding 12.

It should be noted that the waveform shown in FIG. 3 encompass two different modes of operation of the system of FIG. 1. The earlier time period, designated in FIG. 3 by the "Pen Down" notation, illustrates the waveforms for $V_{carrier}$, $V_{21}$, $V_{61}$, $V_{67}$, and $V_{60}$ corresponding to the upper position of movable core 17, when the writing tip 47 is pressed against the writing surface pushing movable core 17 upward against the bias produced by spring 42 (FIG. 2) by a predetermined distance indicated by reference numeral 75 in FIG. 2. Distance 75 is determined by the distance between the top of activating element 19 and the bottom of bobbin 39, and is approximately one-thirty-secondths of an inch in the present embodiment of the invention. The second portion of the above waveforms, designated in FIG. 3 by the "Pen Up" notation, illustrates operation of the system of FIG. 1 when writing tip 47 is raised above the writing surface, whereby spring 42 urges activator element 19 downward against end cap 37B, causing movable core 17 to be moved downward, as indicated by reference numeral 68B in FIG. 1.

It will be readily recognized that when movable core 17 is moved upward, as indicated by numeral 68A, the inductance of section 13 of secondary winding 12 is increased, or at least remains constant, while the inductance of section 15 decreases, causing $V_{21}$ (the voltage at node 21) to undergo a phase shift of 180° (assuming that sections 13 and 15 are symmetrical and the "up" and "down" portions of movable core 17 are symmetrical with respect to the center tap connected to center tap conductor 21). This phase shift is illustrated by the $V_{21}$ waveform in FIG. 3, wherein it is seen that $V_{21}$ is in phase with $V_{carrier}$ in the "Pen Down" operating region and is out of phase with $V_{carrier}$ in the "Pen Up" operating region.

Still referring to FIG. 3, it is seen that $V_{60}$ (the clock signal on conductor 60) is in phase with $V_{carrier}$. $V_{60}$ is produced by the inverter including transistor 55 and resistor 55A, which inverter is driven by a frequency reference circuit (shown in the above referenced patent applications) which determines the frequency of $V_{carrier}$. As explained in considerable detail in the above referenced patent applications, phase sensitive detector 23 produces a half-wave rectified output signal, as shown by waveform $V_{61}$ in response to waveform $V_{21}$. Lowpass filter circuitry 25 produces the DC levels illustrated by $V_{67}$ for the "Pen Down" and "Pen Up" operating regions in response to waveform $V_{61}$. (It should be noted that the omitted transition portion of the waveforms of FIG. 3 includes many cycles of operation, during which the amplitude of $V_{21}$ decreases to nearly 0 volts before the above described 180° phase shift occurs. After the phase shift occurs, the magnitude of $V_{21}$ increases to the level shown in the "Pen Up" region of FIG. 3).

The voltage $V_{67}$ (at node 67 of FIG. 1) is conducted to the negative input of comparator 27, causing $V_{out}$ to switch from a logical "0" to a logical "1" when $V_{66}$ falls below the threshold voltage at node 70; the threshold voltage is established by the voltage divider action of resistors 31 and 33. Thus, $V_{out}$ switches from a logical "1" to a logical "0" when the pen is raised. When the pen is lowered, the filter output goes from near ground to a positive value which, when it exceeds the bias voltage on node 70, causes $V_{out}$ to change from a high level to a low level near ground.

It should be noted that the pen switch capsule 2 of FIG. 2 can have a threaded circumference (not shown), permitting pen switch capsule 2 to be threaded into a receiving portion of a hand held pen having a shaft through which a ballpoint pen ink reservoir 45 extends.

Various alternative pen status switch configurations having a movable ferrite core are encompassed by the present invention. FIGS. 4A, 4B and 4C disclose one such alternative embodiment of the invention, wherein the same reference numerals, followed by the letter "A" or a "prime", are used to designate parts corresponding to those in FIGS. 1 and 2. Referring now to FIG. 4C, a split inductor 12A having a movable ferrite core 17' is utilized, instead of the LVDT of FIGS. 1 and 2. The end terminals 16A' and 16B' of split inductor 12A are externally connected to the end terminals of pen coil 48, as indicated by dotted lines 95 and 96. Split inductor 12A has a center tap conductor 21A.

FIG. 4A discloses a partial sectional side view of a hand held pen 80 incorporating the above mentioned alternate embodiment of the inductive pen status switch of the present invention. Hand held pen 80 includes a shaft 82 having a lower end including a bobbin 106 about which the windings of pen coil 48 are wound. Ink reservoir 45 extends through the hollow central portion of shaft 82 and extends through a cylindrical hole 105 through bobbin 106, so that writing tip 47 protrudes beneath the lower end of pen 80.

The upper end of ink reservoir 45 is snugly engaged within a recess 43A of actuator element 19A (in the manner described above with reference to FIG. 2). Movable actuator element 19A has an enlarged head 107 having a lower surface which rests against and is retained by a lip 108 of plastic shell 86, which is attached to the upper end of shaft 82.

A post 98 is attached to or integral with the upper surface of head 107. The lower end of movable ferrite core 17' is attached to the upper surface of post 98. An upper fixed post 102 having a cylindrical hole 104 through which movable core 17' slidably extends has an enlarged portion 102' rigidly attached to the inner surface of plastic shell 86. A bias spring 42A disposed about posts 98 and 102 and contained by lips 113 and 114 thereof urges actuator element 19A, post 98, and ferrite core 17' to the right toward the lower end of pen 80, so that head 107 rests against lip 108 of plastic shell 86 when writing tip 47 is not being pressed against a writing surface supported by the digitizer. Consequently, a gap (designated by arrows 100) of approximately 1/32 of an inch exists between parts 98 and 102 when writing tip 47 is not pressed against the writing surface.

Movable core 17' also slidably extends upward through a cylindrical centerhole 116 in bobbin 39A, about which sections 15A and 13A (each having roughly 50 to 100 turns) of split inductor 12A are wound, as shown. Split inductor 12A and bobbin 39A are housed within ferrite cup 2A, which is attached to the upper end of plastic shell 86 to thereby contain the magnetic flux produced in split inductor 12A within ferrite cup 2A. Conductors 21A, 16A', 16B' and conductors 89 and 90 extend from the upper end of pen 80 as shown, and run by means of a flexible cable (not shown) from pen 80 to the electronics system of the digitizer (not shown). Center tap conductor 21A extends to the input of a phase sensitive detector (such as 23 in FIG. 1) and conductors 16A' and 16B' extend to the output transformer of a power amplifier which powers pen coil 48.

Thus, it is seen that when pen 80 is not being pressed against the writing surface, the gap designated by arrows 100 is open, and the upper end of movable core 17' rests at a position indicated by reference numeral 111. However, when pen 80 has its writing tip 47 pressed against a writing surface, gap 100 is closed, and movable core 17' is slid upward to a position indicated by dotted line 110, thereby decreasing the inductance of section 15A, and producing a phase reversal in the AC signal on center tap 21A, as shown in waveform $V_{21}$ of FIG. 3.

As shown in FIG. 4B, a tuning "slug" 93 having a slot 93A therein is engaged to or integral with the upper end of bobbin 39A for adjusting the relative position between bobbin 39A and movable ferrite core 17' to optimize or adjust the position at which the above described phase reversal occurs. The outer wall of bobbin 39A and the inner wall of ferrite cup 2A are matingly threaded, so that the position of bobbin 39A relative to movable ferrite core 17' can be adjusted by means of a screwdriver used in conjunction with slot 93'.

While the invention has been described with reference to several embodiments thereof, various modifications to the various elements and interaction thereof may be provided within the true scope and spirit of the invention. For example, the first and second positions may be selected such that no phase reversal of $V_{21}$ occurs. $V_{21}$ could be coupled directly to the input of the filter circuit. A plurality of comparators having different threshold voltage inputs or a hysteresis circuit could be provided (at additional expense) to provide noise immunity.

I claim:

1. In a digitizer, a pen status indicating system for indicating whether a writing tip of a pen is pressed against a writing surface, said pen status indicating system comprising in combination:
   a. a housing for said pen;
   b. a pen cartridge including a writing tip and a reservoir containing writing fluid;
   c. resilient means for resiliently resisting movement of said writing tip toward said housing and urging said writing tip toward said writing surface;
   d. inductive means having first and second series connected windings and a center tap for producing an AC pen status signal on said center tap, said inductive means including a movable core connected in substantially fixed relationship to said writing tip;
   e. signal applying means for applying a first AC signal to said inductive means, said signal applying means also applying said AC signal to a pen coil to effect transmission of an electromagnetic signal for reception by grid conductors of said digitizer;
   f. connecting means for connecting the end of said reservoir to said movable core, causing said movable core to occupy a first position when said writing tip is pressed against said writing surface and a second position when said writing tip is moved away from said writing surface; and
   g. sensing circuit means coupled to said intermediate tap of said secondary winding for producing a pen status logic signal indicating whether said movable core is in said first position or said second position, wherein said sensing circuit means includes a phase sensitive detector circuit for detecting and producing an output signal which is a positive signal when said movable core is in one of said positions and a negative signal when said movable core is in the other of said positions.

2. The pen status indicating system of claim 1 wherein said pen includes a transmitting coil disposed adjacent said writing tip and first conductive means for conducting a second AC signal to said transmitting coil and a frequency reference circuit producing a reference signal which controls the frequency of said second AC signal, said reference signal also controlling the frequency of said first AC signal.

3. The pen status indicating system of claim 2 wherein said first and second positions are selected so that said AC pen status signal undergoes a phase reversal when said movable core moves from one to the other of said positions.

4. The pen status indicating system of claim 1 further including a comparator circuit responsive to said output signal of said phase sensitive detector circuit for causing said pen status signal to be at a first level when said output of said phase sensitive detector is positive and a second level when said output of said phase sensitive detector is negative.

5. The pen status indicating system of claim 1 wherein said phase sensitive detector is clocked by a signal produced in response to said reference signal, said reference signal also being used to drive phase sensitive detector circuitry utilized in conjunction with sensing conductors of a grid located adjacent said writing surface.

6. The pen status indicating system of claim 1 wherein said housing is substantially tubular, and said inductive means is disposed in the interior of said tubular housing in fixed relationship thereto.

7. The pen status indicating system of claim 1 wherein the distance between said first and second positions is approximately one thirty-secondth of an inch.

8. The pen status indicating system of claim 1 wherein said movable core is a ferrite core.

9. The pen status indicating system of claim 1 wherein said inductive means includes a linear variable differential transformer.

10. The pen status indicating system of claim 1 further including resistive means coupled to a reference voltage conductor and to said inductive means, forming a bridge circuit network.

* * * * *